United States Patent [19]

Sacks et al.

[11] Patent Number: 4,736,437

[45] Date of Patent: Apr. 5, 1988

[54] HIGH SPEED PATTERN RECOGNIZER

[75] Inventors: Jack Sacks, Thousand Oaks; Valerie A. Liudzius, Chatsworth; Gary DeZotell, Canoga Park; Richard E. DeKlotz, Moorpark, all of Calif.

[73] Assignee: View Engineering, Inc., Simi Valley, Calif.

[21] Appl. No.: 52,140

[22] Filed: Apr. 21, 1987

Related U.S. Application Data

[63] Continuation of Ser. No. 891,054, Jul. 31, 1986, which is a continuation of Ser. No. 699,892, Feb. 8, 1985, which is a continuation of Ser. No. 443,461, Nov. 22, 1982, abandoned.

[51] Int. Cl.$^4$ .............................................. G06K 9/68
[52] U.S. Cl. ...................................... 382/34; 382/30; 382/44; 382/48
[58] Field of Search ...................... 382/44, 45, 46, 48, 382/8, 30, 34; 364/518, 559, 731; 340/727; 358/22, 106

[56] References Cited

U.S. PATENT DOCUMENTS

| | | | |
|---|---|---|---|
| 3,732,366 | 5/1973 | Bolie | 382/46 |
| 4,179,685 | 12/1979 | O'Maley | 382/30 |
| 4,225,929 | 9/1980 | Ikeda | 382/46 |
| 4,553,214 | 11/1985 | Dettmer | 382/46 |

Primary Examiner—Leo H. Boudreau
Assistant Examiner—Joseph Mancuso
Attorney, Agent, or Firm—Bogucki, Scherlacher, Mok & Roth

[57] ABSTRACT

An apparatus and method for storing a reference scene and a scene under search in separate addressable memories. The reference scene is addressed along a scan line at a selected angle giving the impression that the reference memory has been rotated. The search area information is convolved with a stored reference information to obtain a count representing the number of matches for each search position at a plurality of selected angles. The convolved count is accumulated and the search stopped when the accumulated count exceeds a given threshold value. The X Y coordinates of the best search is determined by evaluating the highest accumulation count. The angle orientation of the search area is determined by addressing each scan line readout of the stored reference area at small angles, convolving the readout against the memory readout, accumulating the count for a selected number of scan angles and determining the angle position having the highest count as a measure of the alignment angle of the search area.

23 Claims, 6 Drawing Sheets

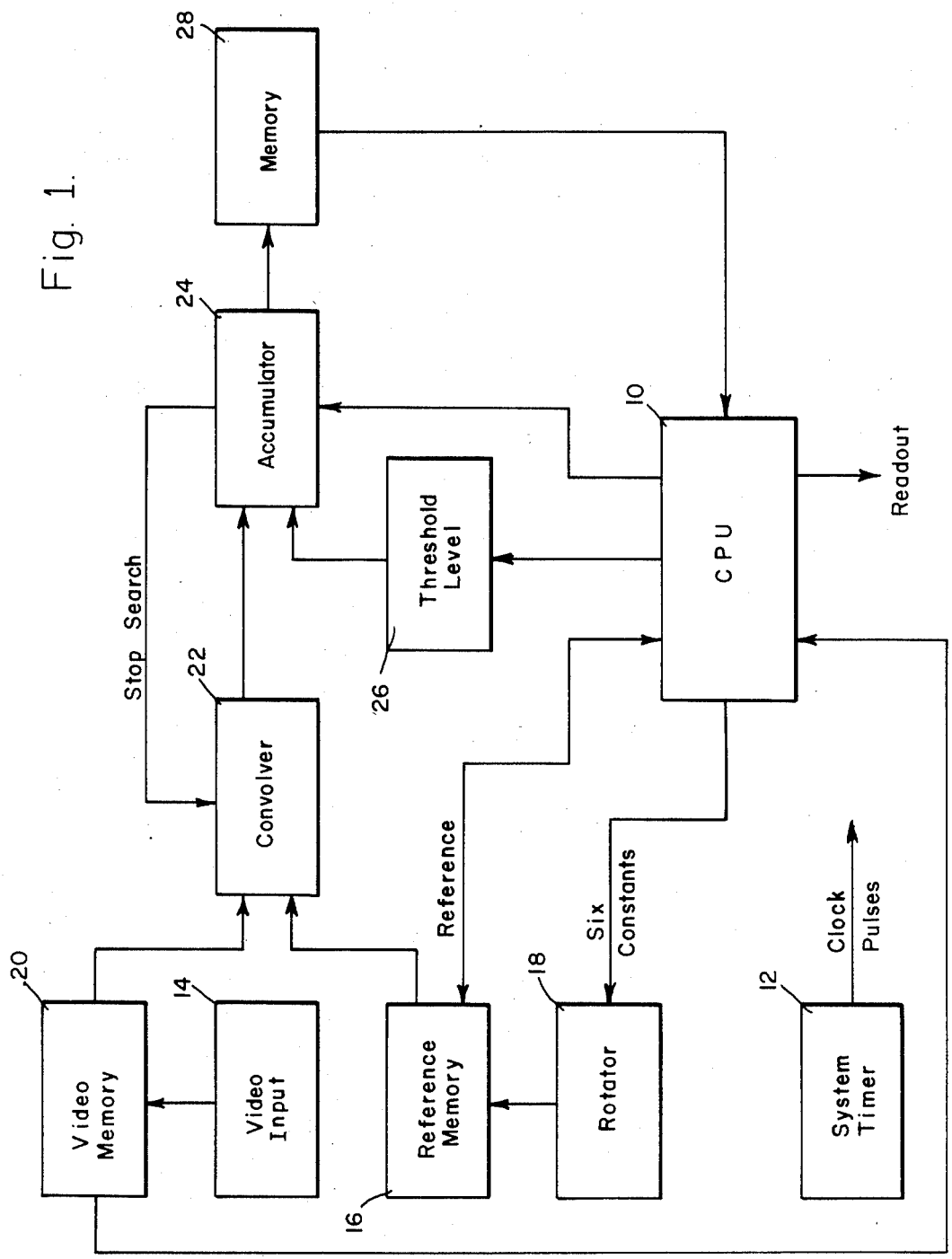

HIGH SPEED PATTERN RECOGNIZER

This is a continuation of copending application Ser. No. 891,054 filed on July 31, 1986, which is a continuation of application Ser. No. 699,892, filed Feb. 8, 1985, which is a continuation of application Ser. No. 443,461, filed Nov. 22, 1982, now abandoned.

This invention relates to a high speed pattern recognizer and more specifically to a method and apparatus for storing a known scene and then searching an unknown scene to determine the coordinates of the best possible match in the shortest period of time.

Pattern recognizers have wide applicability in industry in such diverse fields as automatic alignment, inspection, manufacturing, counting and identification, just to name a few. The pattern recognizer has the ability to automatically recognize and inspect parts and control remote manufacturing operations and without the need of human intervention.

It is important that the pattern recognizer work as fast as possible, be free of errors and be accurate in order to eliminate false alarms so that throughput of the manufacturing process is kept as high as possible and with a minimum of down time.

The present invention represents an improvement over the prior art primarily in the speed of operation.

The prior art is best exemplified by U.S. Pat. No. 4,200,861 entitled Pattern Recognition Apparatus and Method and assigned to the same assignee, View Engineering, Inc. of Simi Valley, Calif. (formerly of Chatsworth, Calif.).

The subject View patent is still the standard by which other pattern recognition systems are measured and has found wide applicability in industry.

In operation, video information obtained in real time is clocked and digitized according to light intensity, with changing light intensities adaptively determining the video threshold level.

Digitized video information is first obtained from a reference scene that is stored in random access memories.

In the search mode, digitized video information is obtained from a scene that is viewed in real time and the stored coarse information of the reference scene is compared in real time with the coarse information from the field of view of the scene being searched. The coarse information from the reference and the coarse information from the scene being viewed is convolved to generate a correlation number indicating the degree of match. The X and Y coordinates for the best match are determined after the scene has been examined. A fine search is then made in the neighborhood of the coarse location previously determined in order to increase the accuracy of the determination of the coordinates of the best match.

The prior art system is extremely accurate and takes approximately 150 milliseconds to complete the finished search.

In utilizing the pattern recognition system of the prior art, it was required that the reference scene being stored in memory be accurately aligned in angle with the live video image in order to minimize error in the determination of the match point coordinates and to maximize the probability of finding a match in the first place.

In actual operation the parts of interest are placed under the optics. The alignment or angular orientation of the individual items is highly critical with respect to the orientation of the stored reference; deviations of more than five degrees degrades performance.

Consider the application wherein a pattern recognizer is used for automatic alignment in a wire bonder for semiconductor chips (IC's).

Inaccuracies occasioned by the user not accurately aligning the microcircuit chip or IC on the lead frame, cause errors in convolving of the reference pattern with the IC to be bonded. A perfectly good IC will then be bonded improperly and the part will be rejected under test. The rejection of otherwise good parts is obviously costly and wasteful to the manufacturer since it represents a high scrap rate and a lower throughput.

Search time for the prior art system is always 150 milliseconds, irregardless of conditions.

Users of pattern recognizers in automated manufacturing operations have developed a need to not only know the location of a given object, but also to determine its angular orientation with respect to a norm. The angular misorientation of a part being searched has created identification and accuracy problems for prior art pattern recognizers.

In wire bonding applications, it is necessary to precisely determine the angular orientation of the IC with respect to the leadframe on which it is mounted. For some of the larger IC's, such as large scale memory chips or microprocessor chips, this angular orientation must be known to an accuracy of $\pm 0.1°$ or better.

Prior art pattern recognizers having no angle measurement capability and cannot measure angle directly, so therefore must rely on the precise measurement of the X and Y coordinates of two widely separated points on the IC from which sufficiently accurate angular information may be computed by software in the bonder itself.

In order to measure these X and Y coordinates accurately, the field of view required by the pattern recognizer is very small because of pixel resolution limitations. This imposes a condition that the two points which are to be located accurately cannot simultaneously reside within the pattern recognizer's field of view. Therefore each of the two points must be looked at and located separately and independently of one another, requiring that the IC (or the camera) must be physically moved from one location to the other.

The time required for physical movement is relatively long, and as a result the throughput rate of finished IC's is unnecessarily and substantially reduced below what is possible with a more sophisticated pattern recognition system.

Since the present invention is capable of precise angle measurement in a single look and in real time, it is now possible to substantially increase throughput rate and reliability in the IC manufacturing process.

In the present invention a method and apparatus has been devised to utilize the searching capabilities of the pattern recognizer system as exemplified by the cited View patent and to provide a capability equivalent to electronically rotating the stored reference data in memory and in real time convolving and thereby comparing the stored reference data against the stored data received from the scene under investigation. The address of the reference scene is rotated a given number of degrees and the stored data read out and correlated against the scene under investigation. Comparison is basically accomplished in the same manner as in the prior art system and results in a count indicating the degree of correlation.

With a reference of 64 pixels by 64 pixels, a perfect comparison with no errors would result in a total match of 4,096; however, it is known from experience that a match of even 3000 is considered acceptable.

The basic search continues until the accumulated count exceeds the given threshold value. At this point in time the rotation of the scan rate of the reference scene in memory is stopped and a fine search is initiated in the conventional manner to determine the X Y coordinate of the best search at that particular angle of alignment. Since the accumulated count exceeded the threshold value, it is known that a match of high quality is in the immediate vicinity and the fine search initiated will determine the X Y coordinate of the best search in that area.

Once the X Y coordinate of the best search is determined, the alignment angle of the search scene relative to the reference can be determined.

The reference is discretely and repeatedly rotated and compared to the scene under investigation until the match count passes from a minimum to a maximum and again to a minimum at which time the search is stopped. The locus of correlation values forms a bell shaped curve having a peak at that angle of rotation which represents the angle at which the best match is obtained.

An interpolation computation is then performed on the data points to accurately compute the angle of maximum match. A particularly useful form of interpolation involves the computation of the centroid of the locus of data points.

The computed angle represents the angle at which the match is at theoretical maximum. This point may occur at any value, either coinciding with a data point or between two data points. The centroid or other interpolation computation is equivalent to increasing the resolution of the angle measurement process. Increments of rotation are preferably fixed at 2.0° for each data point. It is now possible to compute the actual angle value with an accuracy and repeatability better than ±0.1°. The X and Y coordinates and the angle are determined regardless of the angular orientation of the item under investigation on the lead frame. The chip can be placed on the lead frame at any angle from zero to ±180 degrees out of angular alignment.

In basic operation in wirebonding applications the following sequence of events takes place.

A clean, defect-free semiconductor chip is placed under the camera lens and properly aligned and illuminated. The pattern recognition system is placed in the load mode. The part of the semiconductor chip which is to serve as a reference is maneuvered into position so that its image will fall inside of a prescribed or designated area within the field of view defined by a 64×64 pixel region.

The video information contained within this region is converted to bilevel form (comprising a pattern of ones and zeroes) in the system's video processor.

At the discretion of the user, a reference evaluation algorithm may be employed to determine the suitability of the selected reference in terms of uniqueness, noisiness, and statistical relevance to accuracy requirements. Criteria to be applied in this evaluation procedure may include autocorrelation or other evaluation techniques.

Other available algorithms include means for determining which segments of a selected reference may be harmful in terms of noise, and therefore preferably excluded or masked out of the reference.

In addition, procedures are carried out during the load phase to select a match threshold value for detection of significant correlation during the search phase. This threshold may be derived by performing an autocorrelation of the reference against a rotated version of itself to determine the degree of match. If 6.0° rotational increments are employed during search, it is necessary to autocorrelate against rotations of plus and minus 3.0° only. The threshold may then be selected as the worst match number of the pair modified by a constant which anticipates and estimates degradations due to noise and minor pattern variations in the scene to be searched.

In addition, a search over the field of view may be instituted during the load phase to determine the maximum redundant correlation value in order to establish a lower limit on the detection threshold.

During the search phase, the field of view covers the region of the semiconductor where it is expected that the replica of the reference will be found. Video from the field of view (FOV) is linearized and bileveled and stored in memory. At this point the angular orientation of the search region is unknown.

Starting with a particular reference orientation, which may be selected on an arbitrary basis or on the basis of known a priori information (which may be based on probability considerations), the reference is convolved with the stored search field. This search is performed in a coarse manner since its purpose is primarily to detect the existence of a match and to locate its approximate coordinates in the search FOV. If a coarse correlation peak above threshold is found, the coarse search is terminated and a series of fine searches are conducted only in the immediate neighborhood of the coarse peak. During each fine search, the reference orientation is incremented in 2.0° steps in either direction until the best match is found. The appropriate direction of angular incrementation is selected by automatically evaluating the correlation peak value for each fine search to determine whether a particular direction of angle incrementation leads to an increase of correlation peak value.

In the event that a match does not exceed threshold during the first coarse search, the reference is incremented +6.0° in a particular direction from the starting angle and a second coarse search is performed. In the event that threshold detection still does not occur, a second reference angular search is initiated measured −6.0° with reference to the starting angle. This process of alternating in ±6.0° increments is continued until either the detection threshold is exceeded or a predetermined cutoff is reached.

Immediately upon detecting a coarse match, the coarse search is terminated and the 2.0° fine search angular reference incrementations are commenced until the match coordinates are accurately located.

To determine an accurate angular orientation measurement, the fine search is allowed to iterate on both sides of the maximum correlation peak, until sufficient data is available to bracket the best correlation peak value, at which time an interpolation algorithm is employed to curve fit the data or alternately to calculate the centroid or "center of gravity" of the data. By this means the angle of best match can be calculated to an accuracy of ±0.1° even though the reference is only rotated in 2.0° increments for the fine searches.

Search operation is terminated as soon as the desired coordinates and orientation angle is determined, so that no additional search or processing time must be consumed.

Additional savings in time of search is obtainable by programming the machine to start the search for the next object under investigation on the lead frame at the closest angle to that discovered at the prior search.

While the present pattern recognizer can search a full 360 degrees, the time saving by starting the second search at the same angle or close to the angle discovered for the first item can be substantial under some conditions.

The prior art pattern recognizer required 150 milliseconds to complete its search before obtaining a readout. The present pattern recognizer utilizing the apparatus and method described herein can produce readout in an average time of only 50 milliseconds and in that time also give an angle readout position from a single "look" which was not possible in any of the prior art systems.

Prior art systems for electronic image rotation required enormous calculation and storage capacity. The calculation time required and the hardware necessary to implement the rotation operation made it impractical to employ rotational correlation in prior art systems.

In the present invention the rotation is achieved by calculating only six variables for each angle to be stored in memory. This means that it is possible to rotate 360 angles with a minimal amount of memory and, further, that it is possible to implement all procedures in fast real time hardware since there is no requirement for multiplication or trigonometric function computation and no complicated or expensive hardware other than simple accumulators or adders.

In considering the present invention, all references to digitized signals are intended to include multi-level signals (gray scale) as well as two level signals sometimes called binary or bi-level signals.

Further objects and advantages of the present invention will be made more apparent by referring now to the accompanying drawings wherein:

FIG. 1 is a block diagram illustrating the essential portions of the pattern recognizer system constructed according to the present invention;

Figure 2A:
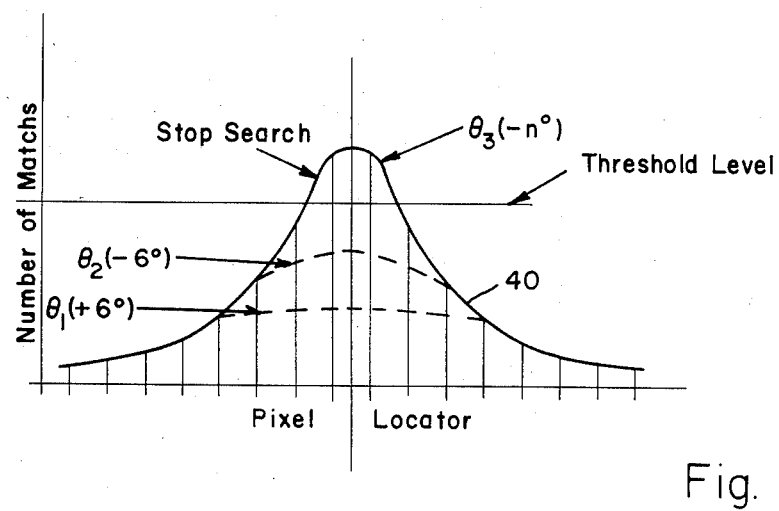
FIG. 2a and 2b is a series of graphs illustrating adaptive thresholding and angle of rotation.

Referring now to FIG. 1, there is shown a block diagram of a complete pattern recognizer system constructed according to the principles of the present invention and utilizing reference adaptive threshold level techniques and the concept of rotating the scan angle of the reference data in memory.

The central processing unit, henceforth called the CPU 10, is the heart of the system and controls the necessary algorithms for controlling the input of data, the digitizing of the data, storing, convolving and comparing of the output data. System timer 12 in the form of a necessary clock having a frequency on the order of 5 megahertz and is the basic timer for the system and controls the generation of all timing pulses needed to digitize the input video information and maintain the timing of the overall system.

All video information is fed to the video memory 20 from the video input 14 that consists of the necessary sensor elements comprising for example a vidicon camera and associated timing circuits for digitizing the video information. The video information is digitized according to well known techniques and in the preferred embodiment positive going signals in the form of a one represent light whereas negative going signals in the form of zero represent dark levels of information. The pattern recognizer is based on the method of first generating reliable clock digital video information that varies in discrete form from one to zero as the result of individual segments that are optically detected as being respectively either light or dark. The video camera and digitizing circuits are associated with the video input 14 and when looking at a single scan will generate a train of pulses a a specific rate as determined by the system timing 12 and vary from one to zero in accordance with the scene being scanned.

The function of the pattern recognizer is based upon the principal of first loading reference data concerning a part under investigation from the video input 14 through the CPU 10 and into a reference memory 16. The CPU 10 also controls a rotator 18 that is capable of reading out the addressed information in the reference memory 16 along any scan line varying from zero through 360 degrees. The rotator 18 controls the angle of scan and does not physically rotate anything but simply allows the reference memory located in 16 to be scanned out at any selected scan angle.

Video information from the scene under investigation is fed from the video input 14 to video memory 20.

The output from the reference memory 16 and the output from the video memory 20 are continuously fed in real time to a convolver 22 that continuously compares the video information from the scene being searched from video memory 20 against the stored data from the reference memory 16 to continuously correlate the information and feed the convolved information to an accumulator 24 under control of both the CPU 10 and a threshold level control 26.

In the preferred embodiment the reference of 64 pixels by 64 pixels is used which for a perfect match would give a correlation number of 4,096 to be stored in the accumulator 24. In actual practice it is known that a perfect match is highly unlikely and for all practical purposes unobtainable. A threshold level of at least 3000 is considered highly reliable of a good match. This number from the threshold level 26 is continuously compared in the accumulator with the compared number from the convolver 22 and when a level is found which has a correlation number greater than or equal to the threshold level, the search is terminated. This point is then evaluated in detail for precision, positional and angular information.

The use of a threshold level control 26 no longer makes it necessary to search the whole search area. If the first part of the video search matches the reference, the search is immediately terminated and almost 100% savings in time is realized. If however the match is not found until the last part of the video is searched, then the savings is minimal; however, on the average, a time savings of 50% is realized over the prior art.

The threshold level 26 is not maintained at a constant level but is dependent on the quality of the video information placed in the reference memory 16. This reference information fed by the CPU 10 is evaluated by appropriate algorithms and based on the quality of the information, the CPU 10 sets a new level for the threshold level 26 in controlling the accumulator 24. Generally in the presence of high quality signals fed to the reference data the threshold level 26 is typically set at a higher level whereas in the presence of degraded signals fed to the reference memory 16 the threshold memory 26 is set correspondingly lower.

In the preferred embodiment the CPU 10 is programmed to control the rotator 18 in six degree segments, thereby causing data from the reference memory 16 to be scanned out along a scan line that is six degrees displaced from the starting position. The output reference data is convolved with the video data from the video memory 20 and accumulated in accumulator 24. The process continues until a level equal to or greater than the threshold level set by threshold level 26 is reached at which time the search is stopped and the address information for that position is stored in memory 28. At that point in time the CPU 10 now programs the rotator 18 to repeat the operation in two degree segments with the stored address of each match to determine a peak value.

Referring now to FIG. 2a, there is shown a graph 40 which shows the output of the accumulator 24 fed to memory 28 for a plurality of rotated positions that vary every six degrees until an accumulated count greater than the threshold value is accumulated.

The initial search started at an arbitrary selected position and the search then varied plus or minus six degrees until the count in the accumulator was determined to be greater than the threshold value. The search continues first plus 6 degrees and then minus six degrees, then plus 12 degrees and then minus 12 degrees, since it has been statistically determined that the likelihood to find a match is greater by rotating about a given reference then arbitrarily rotating 6 degrees in a given direction.

Once the accumulated count greater than the threshold level is determined, the search stops and a fine search is initiated at that angle position in order to determine the X and Y coordinates. In the prior art system the concept of super pixels is disclosed and used with a super pixel being defined as equal to 4 pixels on one side and 4 pixels on the other side and hence having an area of 16 pixels.

In the present invention the concept of a coarse search is used, however, a super pixel is not used but rather a pixel of conventional size is used as a sample taken from an area of 4 pixels. In the preferred embodiment the sample pixel in every area of 4 pixels is taken from the same position and the results obtained are comparable with that of actually generating a new pixel having an area equal to 4 pixels.

The savings in hardware and time in sampling an area or 4 pixels rather than creating a new pixel and searching that area will be obvious to those skilled in the art.

The coarse search now includes a search of an area comprising a single pixel for every 4 pixels or a coarse reference measured by 32 pixels on one side and 32 pixels on the other side, or a total of 1024 pixels in the complete coarse reference.

Search continues in the conventional manner until the CPU determines the X and Y coordinates based upon the coarse search. The coarse search, utilizing a sampled rate of one pixel for every 4 pixels, proceeds in the same fashion as described in the prior art patent utilizing a super pixel.

Upon completion of the coarse search, a fine search is made based upon a normal pixel size. The reference is represented by 64 pixels by 64 pixels and a fine X Y coordinate is determined by the CPU after providing a statistical centroid operation on the maximum accumulation from the accumulator.

Figure 2B:
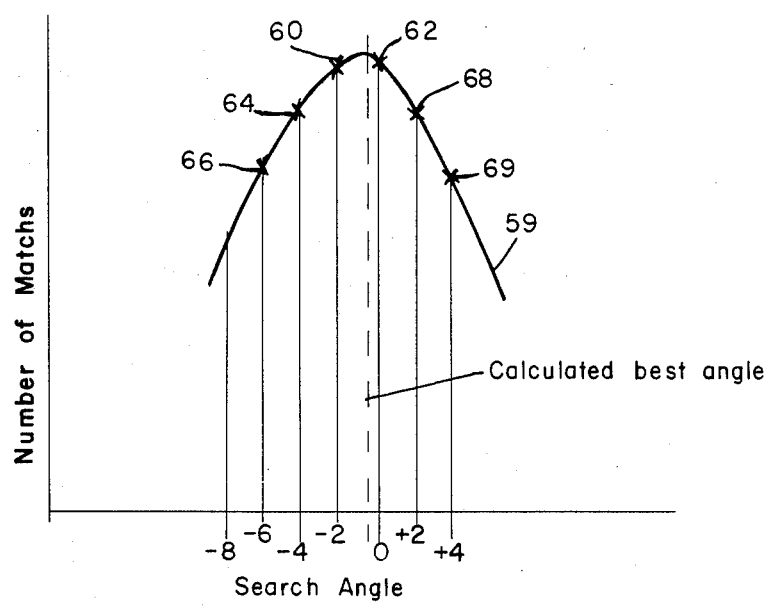

Referring now to FIG. 2b, there is shown a curve 59 representing the accumulation from the accumulator as a result of varying the angle rotator two degrees at the X Y position discovered as the position of the best match.

The rotator 18 is programmed by the CPU 10 to obtain two maximum readings such as 60 and 62. The CPU 10 programs the rotator 18 to move in two degree increments from the initial starting point to obtain two readings on one side of reading 60 such as 64 and 66 and also to obtain two additional readings in two degree increments on the other side of reading 62 such as a 68 and 69.

The accumulated information represented by readings 66, 64, 60, 62, 68 and 69 represented in FIG. 2b is fed to the CPU 10 which performs a centroid operation to determine the maximum center of gravity of the curve which is then read out of the CPU as the angle providing the best match.

The CPU 10 then performs another fine search about the located center of rotation to update the X Y coordinates for the best search and hence the CPU 10 can now read out the X Y coordinates representing the best position and the angle to determine the orientation of the video scene against the reference.

The concept of utilizing a threshold level in combination with the rotating reference memory readout is highly instrumental in achieving the time savings claimed for the present invention.

The threshold level is used to stop the search sequence when a valid match is made between the reference and the video data. The actual procedure used to determine the threshold level is immaterial to the present invention since the level can be arbitrarily set or can be adaptively set by the CPU depending upon the quality of the reference data. A fine search defined by $64 \times 64$ pixels will have a perfect match of 4,096. This presupposes that every pixel in the reference data will compare favorably with every pixel in the video data to thereby give a perfect count of 4,096. Experience indicates that it is impractical to expect such a count, however, experience also indicates that a value varying from 3000 to 3500 represents a high probability of a good match.

In the ideal situation the whole $64 \times 64$ reference data could be matched directly against the $64 \times 64$ video data to determine the actual count.

In the preferred embodiment this is not practical because of economic constraints and the cost of hardware. In practice a coarse search or sampling search is actually designed using the sampled pixels and the $32 \times 32$ reference. 1/16th of the reference data is matched against 1/16th of the video data at a time, thereby requiring 16 separate matching sequences that must be executed and their results added together to get the total number of matches between the reference and the data at any particular point. The total number of matches, which is the correlation number, is then compared to the threshold which we can assume is arbitrarily set to 870 (85% of 1024 max).

Additional savings are realized when using an incremental threshold used to terminate the search at a particular search location.

The benefits in time savings that accrue by using a threshold level can be appreciated by first assuming that after 8 of the 16 matching sequences there were no matches. This would mean that the matches of the last 8 sequences must add up to 870 to reach the threshold. This is actually impossible since a perfect match of half of the reference area is only 512 and to have any chance of reaching the threshold of 870 would require that at least 358 matches (870 minus 512) must have been made when the first 8 matching sequences are complete.

To account for this possibility the hardware is programmed to evaluate the number of matches after 8 matching sequences are completed and if it is less than 358 the search is terminated for that point and the machine instructed to go to the next point for evaluation. This procedure saves considerable time which would be wasted evaluating bad points. This same type of logic can be used each time a match sequence is performed and not only after the 8th matched sequence.

The time savings resulting from utilizing an incremental threshold is more fully appreciated by considering the table below which contains the computation of the minimum threshold after each sequence:

TABLE 1

| Sequence | Perfect Match | Random Matches | |
|---|---|---|---|
| 1 | 870 − (15/16×1024) = −90 | 50%×1/16×1024 = 32 | |
| 2 | 870 − (14/16×1024) = −26 | 50%×2/16×1024 = 64 | |
| 3 | 870 − (13/16×1024) = 38 | 50%×3/16×1024 = 96 | |
| 4 | 870 − (12/16×1024) = 102 | 50%×4/16×1024 = 128 | |
| 5 | 870 − (11/16×1024) = 166 | 50%×5/16×1024 = 160 | |
| 6 | 870 − (10/16×1024) = 230 | 50%×6/16×1024 = 192 | |
| 7 | 870 − (9/16×1024) = 294 | 50%×7/16×1024 = 224 | |
| 8 | 870 − (8/16×1024) = 358 | 50%×8/16×1024 = 256 | |
| 9 | 870 − (7/16×1024) = 422 | 50%×9/16×1024 = 288 | |
| 10 | 870 − (6/16×1024) = 486 | 50%×10/16×1024 = 320 | |
| 11 | 870 − (5/16×1024) = 550 | 50%×11/16×1024 = 352 | |
| 12 | 870 − (4/16×1024) = 614 | 50%×12/16×1024 = 384 | |
| 13 | 870 − (3/16×1024) = 678 | 50%×13/16×1024 = 416 | |
| 14 | 870 − (2/16×1024) = 742 | 50%×14/16×1024 = 448 | |
| 15 | 870 − (1/16×1024) = 806 | 50%×15/16×1024 = 480 | |
| 16 | 870 − (0/16×1024) = 870 | 50%×16/16×1024 = 512 | |
| | Amount of Ref. remaining | Perfect match | % matches expected in a | Part Matched |

TABLE 1-continued

| Sequence | Perfect Match | Random Matches |
|---|---|---|
| | to be matched | random sample |

It will be noted that from the 5th matched sequence to the end that the number of matches required is greater than the number expected by random chance. Thus on the average with a threshold of 870 the search sequence can be terminated after the 5th matched sequence resulting in a time savings of 68.75% (11/16×100%). For a higher threshold the savings are greater and conversely for a lower threshold the savings are less.

The hardware implementation for continually calculating and updating the incremental threshold level is determined as follows:

TABLE 2

| | |
|---|---|
| Since | Incremental Threshold = Threshold − (% Remaining) (Perfect Match) |
| And | # matches ≧ Incremental Threshold (To continue searching this point) |
| Then, | # matches ≧ Threshold − (% Remaining) (Perfect Match) |
| Or, | # matches + (% Remaining) (Perfect Match) ≧ Threshold |
| Or, | # matches + $\left(1 - \dfrac{\text{(Match Sequences Complete)}}{16}\right)$ (Perfect Match) ≧ Threshold |
| Or, | # matches + (Perfect Match) − Match Sequences Complete $\dfrac{\text{Perfect Match}}{16}$ ≧ Threshold |
| | Perfect Match = Constant = $K_1$ |
| | $\dfrac{\text{Perfect Match}}{16}$ = Constant = $K_2$ |
| Therefore, | # Matches + $K_1$ − Match Sequences Complete ($K_2$) ≧ Threshold |
| | # Matches ≧ (Threshold − $K_1$ + MSC ($K_2$)) |

The incremental threshold is compared with the match number in parallel with the comparison of the match number with the termination threshold. If the incremental threshold is not exceeded, the hardware is programmed to stop evaluating the present search location and continue with the next location. When the termination threshold is exceeded, the coarse search is terminated and the fine rotational search is then started.

The curve 59 in FIG. 2b more fully illustrates the fact that the CPU in the preferred embodiment programs the angle rotator 18 to rotate the scanning of reference data in two degree increments as long as the total accumulation of pixel count increases. The CPU is programmed to control the angle rotator 18 in two degree increments for a period of time until the output level again falls below the maximum level. The CPU upon determining that fact then stops the search since it is now apparent that a match has been made and the exact angle can be determined from the centroid and the exact X Y position can be determined by the CPU.

Figure 3:
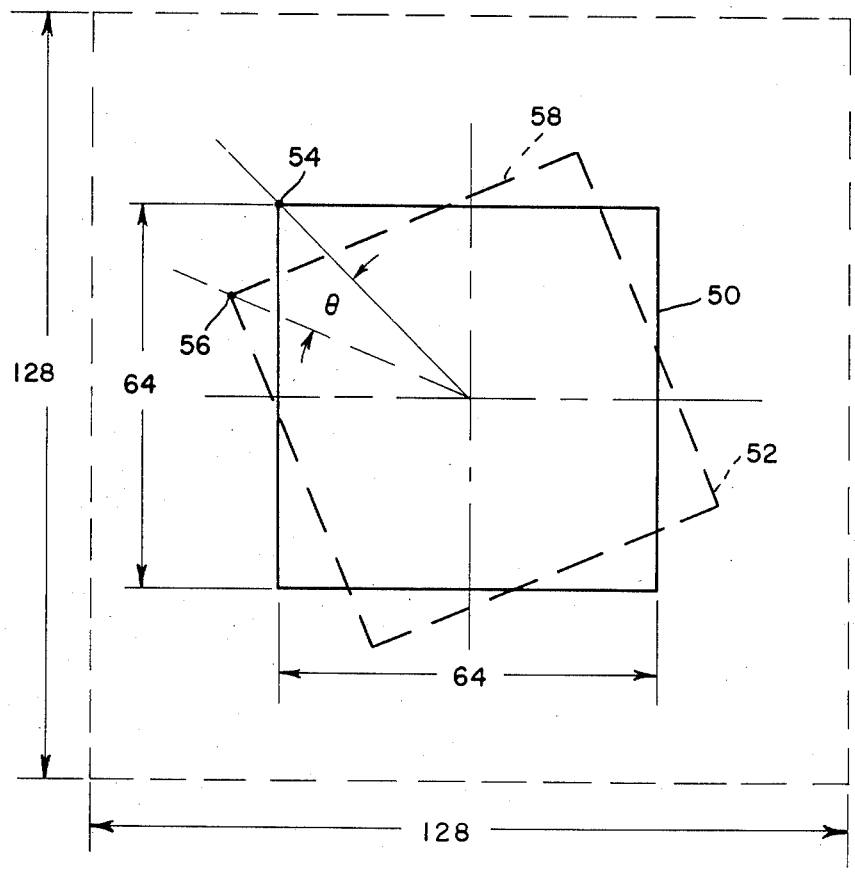
FIG. 3 illustrates reference data in storage and the effect of reading out information along the scan line that is at an angle.

Referring now to FIG. 3, there is shown a 64×64 pixel pattern 50 stored in reference memory 16. Stored pattern 50 actually represents individual bits of information stored in 4,096 positions of addressable memory.

The angle rotator 18 is programmed by the CPU 10 to initially rotate the scanning line of the information stored in reference memory 16 and to read that information out along a scan line that has been rotated a given angle Theta from the initial reference. It should be remembered that the desired data is at all times contained within the memory matrix 50 which contains 64 pixels on one dimension and 64 pixels on the other dimension, or a total of 4,096 pixels. A review of FIG. 3 will make it apparent immediately that rotating the reference area by an angle Theta to a new position 52 will require a reference area substantially larger than the reference area of 64×64 pixels. In the preferred embodiment an area of 128 pixels by 128 pixels is selected in order to guarantee that rotating the reference area 50 through 360 degrees will always maintain a complete reference area of 64×64 pixels.

As mentioned previously, it should be emphasized that the terminology referred to as rotating the reference describes the result of the operation whereby the information is scanned from the reference area 50 at an angle defined by the rotated angle Theta. It is for convenience of explanation and description that we refer to the reference as being rotated, but rather the information contained in addressable memory is read out along a scan direction that is offset by an angle Theta from the original information that was inserted in reference memory 16 and depicted by the reference area 50.

The basic problem concerns identifying point 54 on reference area 50 and rotating the point 54 to point 56 a given angle Theta and read out the information at the rotated reference area 52.

The prior art solution to this problem would be to calculate position 56 in Cartesian coordinates and convert that position to polar coordinates in order to then select the position for the next pixel along the rotated scan line 58. Such a procedure would require enormous calculating capability and memory capability in order to calculate and identify the address for the 4,096 pixel positions for a given angle Theta. The same procedures would then have to be repeated for all 360 degree angles and all this information would have to be stored, thereby requiring enormous calculating capabilities and storage capabilities.

The present invention discloses techniques for locating and identifying all pixel positions on the rotated reference 52 that require only the calculation of six variables for each angle Theta, which information can be conveniently stored in the CPU 10.

Figure 4:
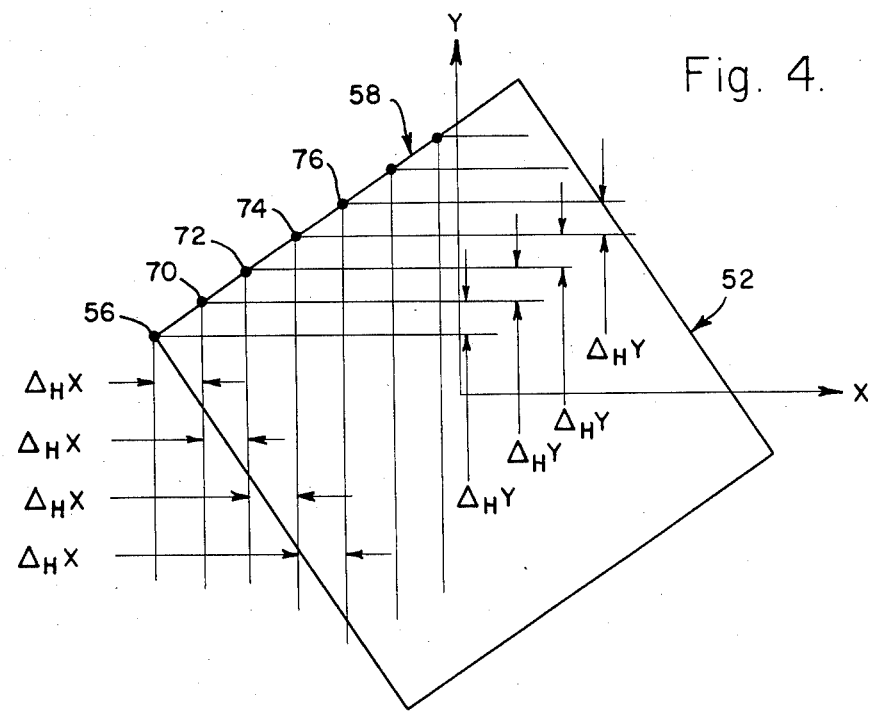
FIG. 4 is a diagram illustrating how two fixed constants are developed along a given scan.

A review of FIG. 4 will show that it is first necessary to calculate the corner position 56 and establish the X and Y coordinates in the CPU 10. The scan of the reference area at the angle Theta must move sequentially along scan line 58 to pixel positions 70, 72, 74 and 76, to and including the 64th pixel position which would be the end of the scan on line 58.

A review of the sequential pixel positions 70, 72, 74 and 76 to the end of the scan line 58 will show equal incremental changes in the X direction identified as $Delta_H X$.

Similarly, a projection of the incremental pixel positions on the Y axis will show equal incremental changes on the Y axis identified as $Delta_H Y$.

The selected terminology is intended to indicate an incremental change in the X direction or an incremental change in the Y direction caused by a horizontal movement of the new pixel position as it progresses from 56 through 70, 72, 74 to the end of the line. In other words, $Delta_H X = Delta_H X = Constant_1$, whereas $Delta_H Y = Delta_H Y = Constant_2$.

In order to scan line 58 at an angle Theta, it is therefore only necessary to calculate the X and Y position of the corner position 56 and then sequentially sum $Delta_H X$ plus $Delta_H Y$ to obtain the coordinate position of pixel 70. The coordinate position of pixel 72 is then obtained from coordinate position 70 plus $Delta_H X$ plus $Delta_H Y$. The process is continued for each pixel position along scan line 58.

In order to obtain the positional information of each pixel on scan line 58, it was only necessary to calculate the X and Y coordinates of position 56 and the $Delta_H X$ and $Delta_H Y$.

Figure 5:
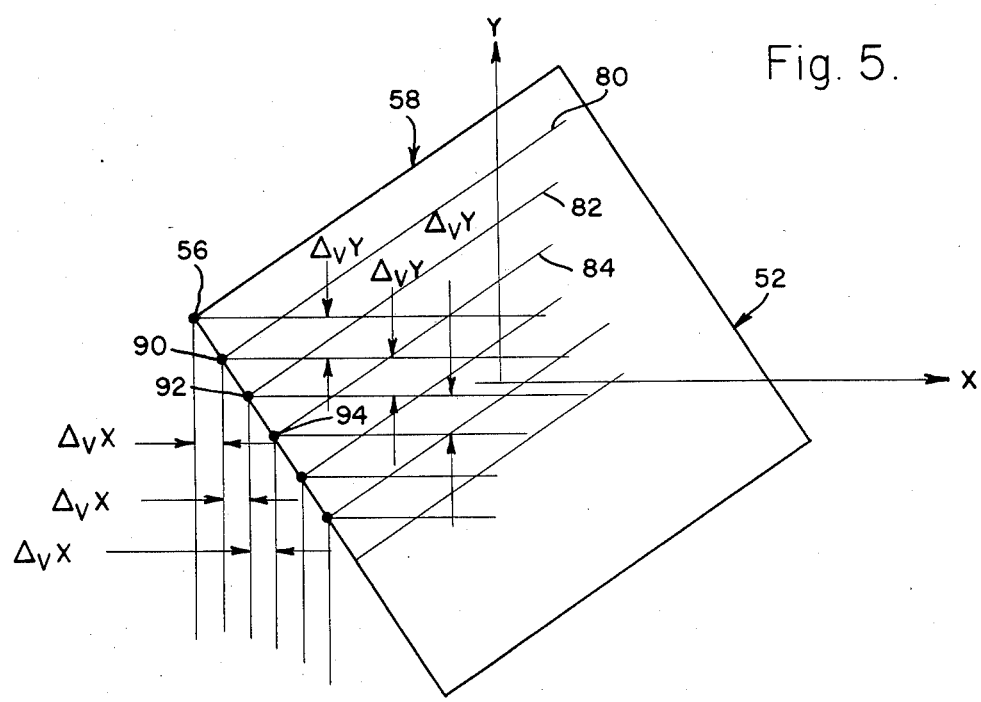
FIG. 5 is a diagram illustrating how two fixed constants are developed for each subsequent scan line.

Referring now to FIG. 5, there is shown the same reference area 52 and which also illustrates the initial scan line 58 together with scan lines 80, 82 and 84 and which continue for 64 scans within the reference area.

The scan line 80 starts one pixel away from position 56 and at angle Theta. Similarly, scan line 82 starts two pixels away from position 56 and at angle Theta, whereas scan line 84 starts at a position that is three pixels away from position 56 and at angle Theta. The position of each subsequent scan line up to the total of 64 scan lines is similarly located from position 56 and at the same angle Theta.

Scan line 80 starts at position 90 whereas scan line 82 starts at position 92 and scan line 84 starts at position 94. The X or horizontal incremental position from position 56 to 90 and from 90 to 92 and from 92 to 94 are all equal to each other for a given angle Theta and are represented as $Delta_V X$. The terminology is intended to show a movement in the X direction as a result of the vertical movement of the scan line.

Similarly, the vertical increment between position 56 and 90 and between position 90 and 92 and position 92 and 94 are all equal to each other and are identified as $Delta_V Y$. This terminology is intended to show the incremental change in the Y direction caused by the vertical displacement of the scan lines. A review of the graph will show that $Delta_V X = Delta_V X = Delta_V X = Constant_3$ whereas $Delta_V Y = Delta_V Y = Delta_V Y = Constant_4$.

A review of FIGS. 4 and 5 will show that any of the 4,096 pixel positions can be addressed by simply calculating the initial X and Y positions of point 56 and calculating the $Delta_H X$, the $Delta_H Y$, the $Delta_V X$ and the $Delta_V Y$ for each angle Theta. In other words, it is possible to address all 4,096 positions by calculating only six discrete bits of information for each angle Theta.

The general equation for finding any pixel position in the Cartesian coordinates is as follows:

$$Y_{N+1} = Y_N + Delta_H Y$$

$$X_{N+1} = Y_N + Delta_H X$$

The implementation of the search pattern from one pixel position to another requires only simple addition of that increment horizontally and the increment vertically to get the new address. The process is continued by adding the same increment both horizontally and vertically until you have all the positions you want on that scan line. For each subsequent scan line the same procedure is repeated adding the new horizontal and vertical increment to establish the new scan line and then repeating the process of adding the horizontal and vertical increments for each new pixel position on the new scan line. In this manner only six variables are needed for each angle which means that for 360 angles it would take a minimal amount of memory. The other immediate advantage is that you get from point to point in a manner that requires no multiplication, no trigonometric functions and in real time since the implementation can be done in hardware and only summers or adders are needed. An unobvious advantage is the fact that it is possible to rotate the reference and convolve the information as it is being read out of memory at the same time with the video data in order to obtain an accumulated number representing a good match. At no time is it necessary to store the whole rotated reference since the information is addressed immediately as it is read out of the reference memory.

Figure 6:
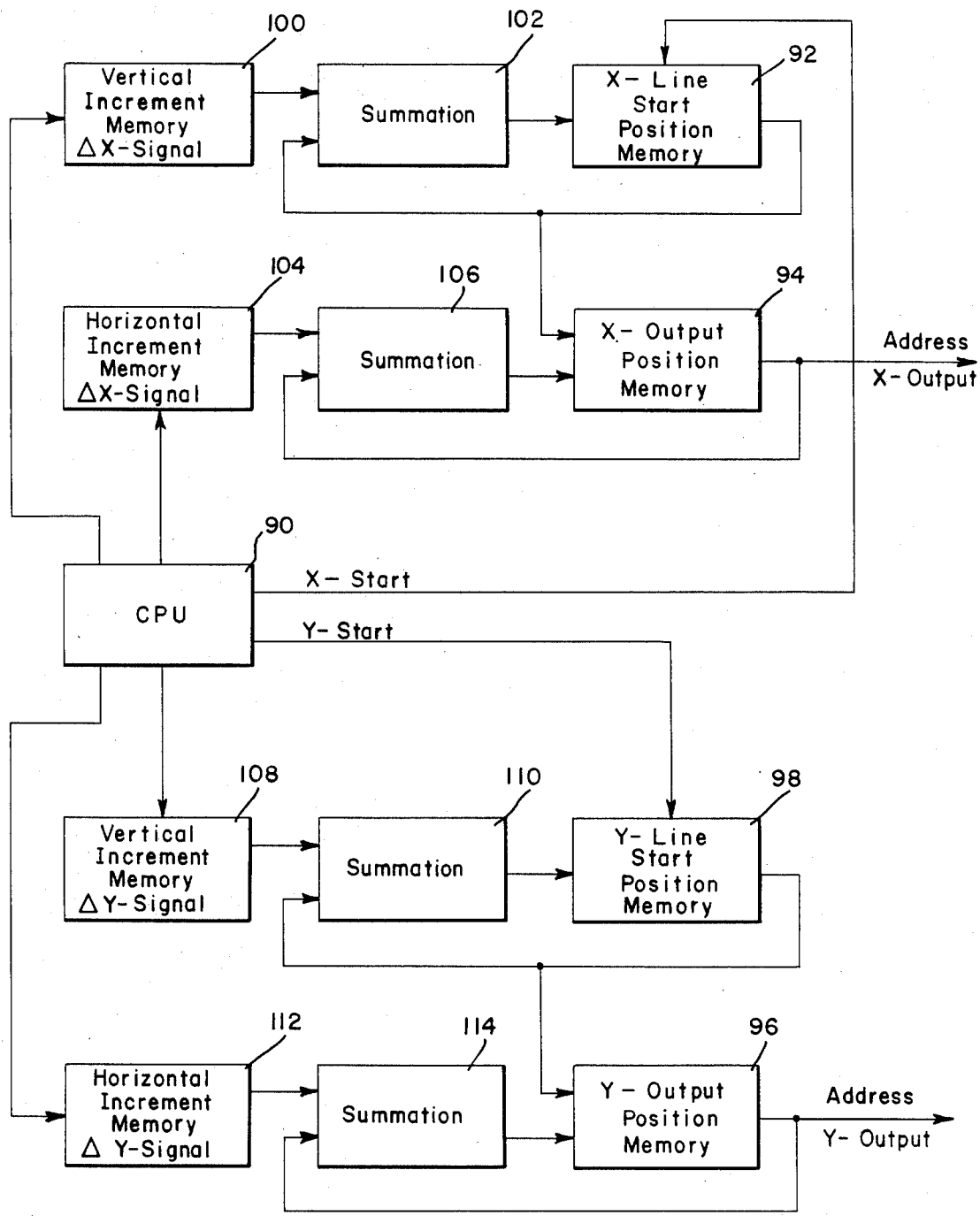
FIG. 6 is a block diagram illustrating the implementation of the six constants for generating the address of the angle rotator scan.

Referring now to FIG. 6, there is shown a block diagram illustrating the implementation of the angle rotator and how the XY coordinates are generated for each of the 4,096 pixel positions and at any angle selected by the CPU.

As mentioned in connection with FIGS. 3, 4 and 5, it is only necessary to store six variables in the CPU.

The CPU 90 has a lookup table which contains the six variables for each of the 360 angle positions identified in connection with FIGS. 4 and 5 as the initial X and Y coordinates of the starting position, the $Delta_H X$ and $Delta_V X$ together with the $Delta_V Y$ and the $Delta_H Y$ incremental positions.

The X and Y address locations for each pixel position will be explained in connection with FIGS. 4 and 5.

The initial X and Y coordinates for position 56 is stored in memory in the CPU for every angle position. The X coordinate is fed to an X line start position memory 92 to an X-output position memory 94. Similarly, the Y coordinate for the initial start position 56 is fed to a Y line start position memory 98 to a Y-output position memory 96.

The vertical incremental Delta X signal is fed from the CPU to memory 100 and then to a summation network 102 which also receives the output of the X line start position memory 92. The summation 102 output also feeds the X line start position memory 92 to continually update the X position, the output of which also feeds the X output position memory 94.

The horizontal incremental Delta X signal is fed from the CPU 90 to memory 104 and then to a summation network 106 which also receives an input signal from the output of the X output position memory 94. The output of the summation 106 continually updates the X output position memory 94 providing updated and continuous X coordinate output information of the address of the pixel under investigation.

The output of the Y coordinate is obtained in a similar fashion with the vertical increment Delta Y signal fed from the CPU 90 to memory 108 and then to a summation network 110 that also receives updated information from the output of the Y line start position memory 98. The output of the summation 110 continually feeds the Y line start position memory 98 to continually update the output information from that memory.

The horizontal incremental Delta Y signal is fed from CPU 90 to memory 112 which feeds summation 114 which also receives input information from the output of the Y output position memory 96. The output of summation 114 also feeds the Y output position memory 96, the output of which supplies the Y coordinate of the address of the pixel under investigation.

In operation the CPU loads the X coordinate into the X line start memory 92 which also feeds X output position memory 94. The output of 94 represents the X address of the initial start position 56.

Similarly, the initial Y start coordinate is fed from the CPU 90 to the Y line position memory 98, which also feeds the Y output position memory 96. The output from the Y output position memory 96 is the Y address for the initial coordinate 56.

Initially the CPU 90 loads memory 100 with the vertical increment Delta X signal. The CPU 90 then loads memory 104 with the horizintal increment Delta X signal. In a similar manner the CPU 90 loads memory 108 with the vertical increment memory Delta Y signal and then the CPU 90 loads memory 112 with the horizontal increment memory Delta Y signal.

The scan along line 58 to the first pixel point 70 is achieved by the horizontal memory X 104 feeding the horizontal increment Delta X signal 104 to summation 106 which sums the Delta X signal with the initial X position from memory 94, thereby updating the X coordinate to position 70 in memory 94. The X output of memory 94 now contains the new X address for pixel 70 on scan 58.

Similarly, the horizontal memory Y 112 feeds the horizontal increment Delta Y to summation 114 where it is summed with the output of memory 96 thereby updating the initial Y position by the $Delta_H Y$ signal to now represent the Y coordinate of pixel 70 on scan 58.

The process continues for pixel positions 72, 74, 76 through the 64th pixel, all contained on line 58. The output of memory 94 represents the X address whereas the output of memory 96 represents the Y address in each case.

After beginning search of the 64th pixel on scan 58, the vertical memory X 100 feeds a vertical increment Delta X signal ($Delta_V X$) to summation 102 which sums the initial X coordinate from memory 92 with the $Delta_V X$ signal and updates the X coordinate for position 56 to position 90 located on the second scan 80. Memory 92 reads memory 94 which now contains the X coordinate for the initial position 90 on scan 80.

Similarly, the vertical memory Y 108 feeds the vertical incremental Delta Y signal ($Delta_V Y$) to summation 110 which updates the initial Y coordinate of position 56 stored in memory and feeds this updated Y coordinate signal to memory 96. The output of memory 96 now contains the Y coordinate of position 90 contained on scan 80.

The process of scanning all 64 pixel positions on line scan 80 continues as before with the memory 104 feeding the horizontal incremental Delta X signal 104 to sumation 106 which updates the X information contained in memory 94 from position 90 to the next pixel position on line scan 80.

Similarly, the Y information for position 90 is updated by the memory 112 feeding the horizontal incremental Delta Y signal to summation 104 which updates the Y information in memory 96 to the new next pixel position on scan 80. The output of 96 now contains the Y address for the next pixel position.

It will be appreciated by those skilled in the art that the X and Y address outputs from memories 94 and 96 continue in real time and it is not necessary to store the outputs but rather to convolve the reference data stored in memory 16 against the video data contained in memory 20 in convolver 2 and in real time.

The system just described in connection with FIG. 6 represents a simplified explanation of the preferred embodiment. Those skilled in the art will immediately recognize there are many ways of achieving a readout of information at an angle and that as new ROM's and PROM's become available, that it may be advantageous to perform the logic in other ways then specifically explained in connection with FIG. 6.

Figure 7:
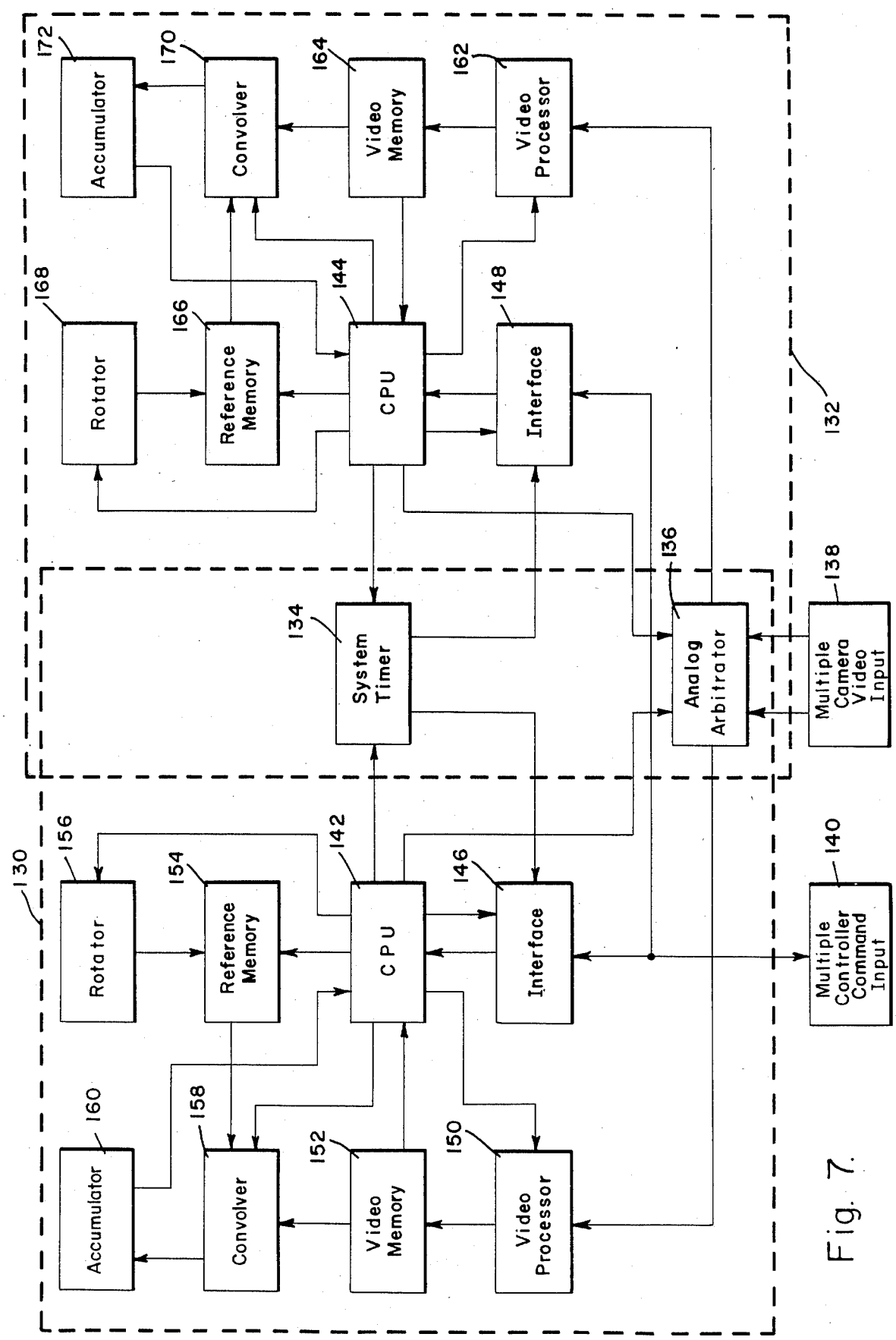
FIG. 7 is a block diagram illustrating two pattern recognizers multiplexed together for providing faster service and with a minimum of down time.

Referring now to FIG. 7, there is shown a preferred embodiment of utilizing at least two pattern recognizers as described in the present invention in a multiplexing operation that improves the reliability and the speed over single unit operations.

The pattern recognizer has found wide applicability in automating the manufacturing process for semiconductors and the like. The requirement for high speed and high accuracy can be appreciated when it is realized that production of semiconductor components are over 40 million units a month and that an increase by only 10% represents increased capacity of an additional 4 million units per month, which is a tremendous increase.

It can be appreciated, therefore, that speed of inspection and reduction of false alarms and reliability are of paramount importance in order to maximize the throughput of units being produced.

The pattern recognizer works in combination with other equipment such as a wire bonder that interconnects the contacting points called pads on the IC's with fingers that connect the electrical signals to outside circuitry. The wire bonder must be manipulated in a precise manner to make the interconnections with the pads.

The pattern recognizer automatically locates the reference and supplies the positional information to the wire bonder which then performs the necessary bonding and processing operation.

Prior to the advent of the present invention, the prior art pattern recognizers required a minimum of 150 milliseconds to make each search before the part could be identified. In addition, angle information required an additional step by the microprocessor to identify a second area on the same chip so that logic operation could be performed to determine the angle between the two identified areas and supply this angle information to the wire bonder. This additional step also required 150 milliseconds plus the machine time of physically moving the IC to a new location for the inspection process. The time for the first search, the time for the second search and the time for the moving operation had the effect of reducing the manufactured output of the IC's with a corresponding drop in throughput.

It was very quickly recognized that during the period of time that the wire bonder was performing the bonding operation that the pattern recognizer was in a standby waiting position waiting for the wire bonder to finish its operation and move the next chip in position for identification by the pattern recognizer.

The pattern recognizer constructed according to the principles of the present invention now has an average time of search of approximately 50 milliseconds because of the features of the threshold device and the angle rotator. As mentioned previously, the angle rotator provides angle information as a result of making a single positional search whereas the thresholding concept reduces the time of inspection of the pattern recognizer by stopping the search in areas where the probability of finding a match is considered remote and terminating the coarse search when a good match is found.

The time savings in the new pattern recognizer, based only on the rotating device, represents a saving for inspection from 300+ milliseconds to an average of 50 milliseconds which represents a significant throughput increase, however, until, the advent of the multiplexing scheme as disclosed in FIG. 7, there was no practical way of minimizing the waiting time of the pattern recognizer during the bonding operation or moving operation of the individual IC's from position to position.

In the typical manufacturing operation, a single wire bonder is associated with a single pattern recognizer. The individual chips are typically loaded on a lead frame with multiple chips being mounted on the lead frame, each are brought within the field of view of the vidicon camera. The information viewed by the camera is fed to the pattern recognizer under control of the wire bonder. The pattern recognizer then initiates a search of the scene being viewed against the scene in memory to determine a match. The location of the match is then communicated by the pattern recognizer to the wire bonder which performs the necessary manufacturing steps while the pattern recognizer waits for a signal from the wire bonder indicating completion of the operation. The wire bonder when completed then moves the lead frame to the next chip in line and signals the pattern recognizer to evaluate the scene viewed by the vidicon camera to again repeat the steps.

The multiplexing system illustrated in FIG. 7 is concerned with utilizing at least two separate pattern recognizers 130 and 132 sharing a common system timing network 134 and an analog arbitrator 136.

In the preferred embodiment 8 wire bonders representing 8 manufacturing stations are used in connection with the two pattern recognizers 130 and 132. Experience has shown that either pattern recognizer 130 or 132 can handle each of the 8 wire bonders because of the necessary waiting time required by the manufacturing operation of each wire bonder.

The purpose of having two separate pattern recognizers operating in parallel allows both of the pattern recognizers 130 and 132 to receive all of the information from all 8 wire bonders from the multiple camera signal inputs 138 which are fed to the analog arbitrator 136.

The command signals from the multiple controller command inputs 140 originate from the 8 wire bonders which control the operation of both pattern recognizers 130 and 132. Typically the command signals include load, search, which command signals control the operation of the selected pattern recognizer.

The single timing system 134 insures that both pattern recognizers 130 and 132 are synchronized together and are viewing the same scene at the same time and recording the same information at the same time. This insures that a command signal from multiple controller command input 140 can select either of the pattern recognizers for operation and without causing a delay or waiting time.

The concept of utilizing dual pattern recognizers in parallel for all 8 wire bonders allows each of the pattern recognizers 130 and 132 to be continually monitored one by the other to insure that each is operating. This is accomplished by having the CPU 142 in pattern recognizer 130 and the CPU 144 in pattern recognizer 132 to initiate pulses to the system timer 134 in a manner that is termed in the industry as a watchdog timer. This watchdog timer provides a means for the system timer 134 to determine that each of the pattern recognizers is working and available for accepting an assignment from the multiple controller command input 140. Should either of the CPU's 142 or 144 stop sending the necessary impulses to the system timer 134 for a given period of time, then the timing signals sent to that pattern recognizer will be terminated and that pattern recognizer will be taken off the line as an indication that something is wrong or that that system is not available for receiving signal inputs. In that situation the remaining pattern recognizer will handle the complete assignment until the problem is corrected and the necessary timing signals are again received from the CPU. The watchdog timer may be considered as a simple timer that is re-armed over a period of time by impulses from each of the CPU's and in the absence of receiving these pulses the system timer is caused to operate and in that manner takes the offending pattern recognizer off the line.

The system timer 134 also controls interface 146 and 148 in order to determine which of the pattern recognizers is in control of any of the 8 wire bonders. It will be appreciated that all 8 input channels from multiple control command input 140 are fed to both interfaces 146 and 148 in parallel and it is the purpose of the system timer 134 to continually determine which interface is in control of which channel. This process continues until the watchdog timer is not energized by either of the CPU's 142 or 144 not sending in the necessary pulses. At that point in time the system timer then controls the appropriate interface to switch control of the selected channels being fed to that pattern recognizer that is no longer on the line and switches the assignment to the pattern recognizer that is still working. In this manner the system timer continually monitors the operation of both pattern recognizers and immediately reacts to the watchdog timer being enabled by failure of the associated CPU to send the necessary timing pulse.

In operation, the multiple controller command input 140 will submit a request from any of the 8 bonders to both of the pattern recognizers 130 and 132 through the interface 146 and 148. Both units in the absence of receiving any command input signals will normally be in a self-test mode in each of their associated CPU's, sending out signals to the system timer 134 in accordance with the operation of the watchdog timer indicating that both pattern recognizers are available for work. Both interface 146 and 148 pass the request for information received from the command input 140 to the associated CPU 142 and 144, each of which answer the request to their associated interface. The first unit answering the request for command input is assigned on the priority basis to handle that command input and the associated CPU 142 or 144 upon accepting the assignment from the interface will then communicate to the system timing 134 that it has accepted the assignment.

The operation of either of the pattern recognizers 130 and 132 is the same as that described in connection with FIG. 1 with the obvious difference of the shared system timer 134 and the analog arbitrator 136.

For completeness there is shown a video processor 150 which receives the video information from the multiple camera video input 138 for storing in video memory 152. The video processor is controlled by the CPU 142 which also controls the reference memory 154 which stores the reference memory.

The rotator 156 under control of the CPU 142 scans the information in the reference memory 154 at the selected angle for reading out the stored information in real time to the convolver 158 which convolves the information from the reference memory 154 and the information under examination stored in video memory 152. The convolved count is accumulated in an accumulator 160 and fed to the CPU 142 which performs the centroid operation for determining the maximum match and at the specific angle.

The operation of the pattern recognizer 132 is the same as that just described and for completeness includes video processor 162 which feeds video information to video memory 164 under control of CPU 144. The reference memory is stored in reference memory 166 and the CPU 144 controls the rotator 168 which scans the information in the reference memory 166 for reading out in real time to convolver 170 which convolves the information from the reference memory 166 and the information under examination in video memory 164. The output of the convolver 170 is fed to an accumulator 172 which accumulates the total count that is fed back to the CPU 144 which performs the centroid operation for determining the coordinates of the match and the computations for determining the specific angle.

The concept of providing two pattern recognizers, each capable of handling the complete load of 8 wire bonders, provides an output speed that is greater than utilizing a single pattern recognizer capable of handling all 8 wire bonders. The capability of sharing the load equally by each pattern recognizer provides a minimum of down time and a minimum of waiting time for assignments from the wire bonders. The attendant increase in speed provides increased output and in a manner not previously contemplated by the prior art or by industry.

We claim:

1. A pattern recognition method for rapidly determining the location and orientation between a reference area and a search area comprising the steps of:

generating a series of clocked digitized video pulses representative of a reference area, recording said series of clocked pulses representative of a reference area in a plurality of separate addressable memory locations, generating a series of clocked digital pulses representative of a search area, recording said series of clocked pulses representative of a search area in a plurality of separate addressable memory locations, electronically addressing each scan line of said stored reference area in memory at any selected coarse scan angle, correlating said stored pulses received from said search area with each of said stored reference pulses derived from addressing the reference area to obtain an accumulation count for each coarse scan angle selected, repeating said scan for a plurality of coarse scan angles to obtain a coarse scan angle having an accumulation count greater than a threshold count, selectively addressing each scan line of said stored reference area in memory at fine discrete search angles about the coarse scan angle having an accumulation count greater than a threshold count, accumulating a separate count for each of a plurality of different fine discrete scan angles about said coarse scan angle having an accumulation count greater than said threshold count in separate addressable memory locations aassociated with each selected fine discrete scan angle position, statistically determining from the separate counts for fine discrete scan angles the precise angular alignment of the search area and the coordinates of the search area.

2. A pattern recognition method according to claim 1 in which accumulation counts are recorded for each of a plurality of said fine discrete scan angles.

3. A pattern recognition method according to claim 2 which includes the method step of performing a mathematical evaluation of the accumulated counts to determine a fine angle representing the angular alignment of the search area.

4. A patter recognition method according to claim 2 in which each selected fine discrete scan angle is two degrees.

5. A pattern recognition method for rapidly determining the location and orientation between a reference area and a search area comprising the steps of:
   generating a series of clocked digitized video pulses representative of a reference area,
   recording said series of clocked pulses representative of a reference area in a plurality of separate addressable memory locations,
   generating a series of clocked digital pulses representative of a search ares,
   recording said series of clocked pulses representative of a search area in a plurality of separate addressable memory locations,
   electronically addressing each scan line of said stored reference area in memory and at any selected angle,
   establishing an incremental threshold defined as an intermediate accumulated count having a value from which the maximum number of matches remaining could not accumulate a desired high accumulation count,
   correlating said stored pulses received from said search area with each of said stored reference pulses derived from addressing the reference area to obtain an accumulation count for each coarse scan angle selected,
   repeating said scan for a plurality of coarse scan angles to obtain a selected coarse scan angle having an accumulation count greater than a threshold count,
   stopping the completion of a scan at an intermediate point when the accumulated count for the scan is below the incremental threshold and selecting a new angle for scanning,
   accumulating a separate count for each of a plurality of different fine scan angles about said selected coarse scan angle in separate addressable memory locations associated with each selected fine scan angle position, and
   statistically determining from each of said separate accumulated counts the precise angular coordinate of a final scan angle which corresponds to the highest theoretical accumulation count that would be derived if all the pulses matched.

6. A pattern recognition method for determining the best comparison between a reference area and a search area comprising the steps of:
   generating a series of clocked digitized video pulses representative of a reference area,
   recording said series of clocked pulses representative of a reference area in a plurality of separate addressable memory locations,
   generating a series of clocked digital pulses representative of a search area,
   recording said series of clocked pulses representative of a search area in a plurality of separate addressable memory locations,
   electronically addressing each scan line of said stored reference area in memory and at any selected angle,
   correlating said stored pulses in said search area with said stored reference pulses to obtain an accumulation count representing the number of matches for each search position of said plurality of selected angles,
   repeating said scan for a plurality of angles to obtain an accumulation count for each angle selected,
   storing the accumulation count for a plurality of different angles in separate addressable memory associated with each selected angle position;
   establishing a threshold level for the accumulation count,
   stopping the correlating action at a first scan line angle whenever the accumulation count is above the threshold value,
   determining the X Y coordinates of the search area at the first scan line angle,
   electronically addressing the stored reference area in memory at smaller angles about the first scan line angle used to determine the X Y coordinates of the search area and accumulating the counts for each of said plurality of different smaller angles in separate addressable memory associated with each angle position,
   performing a mathematical evaluation of the accumulated counts to determine a final scan line angle corresponding to the highest theoretical accumulation count, and
   said final scan line angle representing the angular alignment of the search area.

7. A pattern recognition method according to claim 6 which includes the step of recalculating the location coordinates of the reference in the search area based on the angular alignment position of the search area.

8. A pattern recognition system for determining the best comparison between a reference area and a search area at high speeds consistent with a production process comprising:
   means for generating a series of clocked digitized video pulses representative of a reference area,
   means for recording said series of clocked pulses representative of a reference area in a plurality of separate addressable memory locations,
   means for generating a series of clocked digital pulses representative of a search area,
   means for recording said series of clocked pulses representative of a search area in a plurality of separate addressable memory locations,
   means for electronically addressing a plurality of scan lines of said stored reference area in memory at any selected angle,
   means for correlating said stored pulses in said search area with said stored reference pulses to obtained an accumulation count representing the number of matches for each search position of said plurality of selected angles,
   means for repeating said scan for a plurality of angles to obtain an accumulation count for each angle selected,
   means for storing the accumulation count for a plurality of different angles in separate addressable memory associated with each selected angle position,
   means for establishing a threshold level for the accumulation count, means for stopping the correlating action at a first scan line angle whenever the accumulation count is above the threshold value, means for determining the X Y coordinates of the search area at the first scan line angle, means for electronically addressing the stored reference area in memory at smaller angles about the first scan line angle to determine the X Y coordinates of the search area and accumulating the counts for each of said plurality of different smaller angles in separate addressable memory associated with each angle position, means for performing a mathematical evaluation of the accumulated counts to determine a final scan line angle corresponding to the highest theoretical accumulation count, and said final scan line angle representing the angular alignment of the search area.

9. A pattern recognition method for rapidly determining the location and orientation of a scene in a search area relative to a reference pattern held in picture element form in a first memory comprising the steps of:

storing the scene in picture element form in a second memory, reading the picture elements from the second memory in sequential fashion to provide a scene image representation in the form of a first succession of picture element signals, concurrently reading picture elements representing a reference scene from the first memory in sequential fashion but at a controllable scan angle relative to the reference pattern held in the first memory to provide a reference image representation in the form of a second succession of picture element signals, the reference image having a size and shape matching the scene image representation with each picture element of the reference image corresponding to a pixel of the scene image, matching the images by counting the number of like corresponding picture elements in the two successions of signals, and repeating the matching step with different reference image scan angles until the count reaches a predetermined threshold that identifies an image scan angle corresponding to a known degree of match, wherein the matching step further comprises: selecting fixed small scan angles; accumulating further counts from each matching of the object image to the reference pattern at fine scan angles about the scan angle at which the given threshold is first exceeded; and statistically calculating the scan angle at which an optimum match exists.

10. The method as set forth in claim 9 above, wherein the one out of a number of picture elements in successive sets are matched in periodic fashion to provide a coarse search.

11. The method as set forth in claim 10 above, further including the steps of calculating a fixed number of incremental values for each angular deviation in the scan angle from parallelism to a rectangular matrix, and determining picture elements to be read from the first memory at any chosen scan angle from the incremental values.

12. The method as set forth in claim 9 above, wherein the scan angles vary by about 6° and wherein the scan angles are varied first in one direction and then the other from a staring position.

13. A pattern recognition method for rapidly determining the location and orientation of a scene in a search area relative to a reference pattern held in picture element form in a first memory comprising the steps of:

storing the scene in picture element form in a second memory, reading the picture elements from the second memory in sequential fashion to provide a scene image representation in the form of a first succession of picture element signals, concurrently reading the picture elements from the first memory in sequential fashion but at al controllable scan angle relative to the reference image to provide a reference image representation in the form of a second succession of picture element signals, matching the images by counting the number of like picture elements in the two successions of signals, repeating the matching step with different reference image scan angles until the count reaches a predetermined threshold count that identifies an image scan angle corresponding to a known degree of match, and establishing an intermediate incremental threshold count defining an intermediate count which is so low that the predetermined threshold count could not be reached even with a perfect match, and stopping a given matching step and proceeding to another reference image scan angle when the intermediate count is below the intermediate incremental threshold.

14. A pattern recognition method for rapidly determining the location and orientation of a scene in a search area relative to a reference pattern held in picture element form in a first memory comprising the steps of:

storing the scene in picture element form in a second memory, reading the picture elements from the second memory in sequential fashion to provide a scene image representation in the form of a first succession of picture element signals, concurrently reading the picture elements from the first memory in sequential fashion but at a controllable scan angle relative to the reference image held in the first memory to provide a reference image representation in the form of a second succession of picture element signals, matching the images by counting the number of like picture elements in the two successions of signals, repeating the matching step with different reference image scan angles which vary by a predetermined minimum angle until the count reaches a predetermined threshold that identifies an image scan angle corresponding to a known degree of match, and further defining the angle at which the scene image matches the reference pattern by matching the images with the reference pattern scanned at angles deviating from that image scan angle at which the count reached a predetermined threshold, such angles being less than the predetermined minimum.

15. The method as set forth in claim 14 above, wherein the method further includes the steps of deriving second counts from matching the images at angles relative to the image scan angle at which the count reached a predetermined threshold, and statistically computing a final angle representing optimum correlation from the derived second counts.

16. The method as set forth in claim 15 above, wherein the method further includes the step of deriving the second counts using a number of scan angles on each side of the image scan angle at which the count reached a predetermined threshold, and calculating from the counts the peak of the characteristic bell-shaped curve distribution established when matching the scene to the reference pattern as the later is rotated through different angles.

17. A system for identifying the position and orientation of an object corresponding to a reference pattern, comprising:

scanning means for viewing the object and providing a scene signal carrying picture element information which represents an object scene that includes the object;

first storage means receiving the scene signal and storing scene data representing the scene as a plurality of picture elements;

second storage means for storing reference data comprising a multiplicity of picture elements which represent the reference pattern, said second storage means including means for addressing the second storage means to read therefrom at varying scan angles to the reference pattern picture elements representing a reference scene which corresponds in size and shape to the object scene;

correlator means coupled to the first and second storage means for matching picture elements representing the object scene with picture elements representing the reference scene read out at different scan angles, said correlator means including counter means for accumulating the number of matches derived at each scan angle;

threshold means responsive to the counter means for determining when the count derived from a given scan angle exceeds a predetermined amount indicting a selected degree of match;

means coupled to the correlator means for storing accumulated counts for a number of matches derived from different scan angles about the given scan angle; and means coupled to receive the stored accumulated counts for statistically analyzing the variation in matching characteristics with scan angle to derive the precise angle orientation and coordinate position of the object.

18. The invention as set forth in claim 17 above, wherein the system further includes incremental threshold means coupled to the correlator means for comparing the accumulated count at an intermediate point in the matching sequence to the predetermined amount, the incremental threshold means operating to terminate the matching at the then existing scan angle prematurely when the predetermined amount cannot be reached if the matching is carried to conclusion.

19. A system for identifying the position and orientation of an object corresponding to a reference pattern, comprising:

scanning means for viewing the object to provide a sequence of scene picture element signals;

first storage means receiving the scene picture element signals and storing scene data;

second storage means for storing reference data comprising a multiplicity of picture elements, said second storage means including means for addressing the second storage means to read the picture elements out at varying scan angles to the reference pattern;

correlator means coupled to the first and second storage means for matching picture elements from the scene data with picture elements from the reference pattern read out at different scan angles, said correlator means including counter means for accumulating the number of matches derived at each scan angle, the correlator means and means for storing including means for generating a first coarse match by varying the scan angle by predetermined angular increments, and means for generating a second match by varying the scan angle about the given scan angle at angular increments smaller than the predetermined angular increments;

threshold means responsive to the counter means for determining when the count derived from a given scan angle exceeds a predetermine amount indicating a selected degree of match;

means coupled to the correlator means for storing accumulated counts for a number of matches derived from different scan angles about the given scan angle; and means coupled to receive the stored accumulated counts for statistically analyzing the variation in matching characteristics with scan angle to derive the precise angle orientation and coordinate position of the object.

20. The invention as set forth in claim 19 above, wherein the means for addressing the second storage means comprise means for selecting picture elements in accordance with a fixed number of precalculated incremental variables defining the succession of picture element positions needed for a given scan angle.

21. The invention as set forth in claim 20 above, wherein the correlator means generates the first coarse match at higher speed by using only one out of each given number of picture elements, and generates the second match by using each of the picture elements.

22. A system for determining the orientation of an object relative to a reference pattern stored as a matrix of picture elements in an addressable memory, comprising:

means for providing a stored image, as a plurality of picture elements, of the object;

means for addressing the memory to read out the picture elements from the matrix with any of a number of different individual scan angles varying from each other by at least a predetermined amount;

means for concurrently reading out the picture elements from the stored image of the object at a fixed angle;

means for matching the picture elements of the object image and the reference pattern during readout to derive an accumulated count of picture element matches for each scan angle;

means responsive to the accumulated count and controlling the means for matching to terminate use of scan angles varying by the predetermined amount when a given threshold is first exceeded; and means coupled to the means for matching and the means for addressing for deriving a final orientation value for the object from scan, with scan angles less than the predetermined amount, about the scan angle at which the given threshold is first exceeded.

23. The invention as set forth in claim 22 above, wherein the means for deriving a final orientation value includes means for selecting fixed small scan angles, means for accumulating further counts from each matching of the object image to the reference pattern at fine scan angles about the scan angle at which the given threshold is first exceeded, and means responsive to the further counts for statistically calculating the scan angle at which an optimum match exists.

* * * * *

UNITED STATES PATENT AND TRADEMARK OFFICE
CERTIFICATE OF CORRECTION

PATENT NO. : 4,736,437
DATED : April 5, 1988
INVENTOR(S) : Jack Sacks et al

It is certified that error appears in the above-identified patent and that said Letters Patent are hereby corrected as shown below:

Column 10, line 7, below underscore insert --Incremental Threshold = Threshold - (% Remaining) (Perfect Match)--.

Column 10, last line of TABLE 2, "MSC ($K_2$)" should read --(MSC ($K_2$))--.

Column 19, line 21, "ares" should read --area--.

Column 20, line 13, ";" (semi-colon) should read --,-- (comma).

Column 22, line 13, "al" should read --a--.

Signed and Sealed this

Twentieth Day of December, 1988

Attest:

DONALD J. QUIGG

Attesting Officer

Commissioner of Patents and Trademarks